United States Patent [19]

Luk

[11] 4,302,971
[45] * Dec. 1, 1981

[54] LIQUID CRYSTAL TEMPERATURE INDICATOR FOR MEASURING HUMAN BODY TEMPERATURE

[75] Inventor: Catherine M. Luk, Kowloon, Hong Kong

[73] Assignee: Carice International Products, Ltd., Hong Kong, Hong Kong

[*] Notice: The portion of the term of this patent subsequent to Apr. 22, 1997, has been disclaimed.

[21] Appl. No.: 91,042

[22] Filed: Nov. 5, 1979

Related U.S. Application Data

[63] Continuation-in-part of Ser. No. 940,746, Sep. 8, 1978, Pat. No. 4,198,861.

[30] Foreign Application Priority Data

May 2, 1979 [EP]  European Pat. Off. ......... 101328/79
Sep. 12, 1977 [GB]  United Kingdom ............... 37991/77

[51] Int. Cl.³ ........................................... G01K 11/12
[52] U.S. Cl. .................................... 73/356; 128/736
[58] Field of Search .......................... 73/356; 128/637

[56] References Cited

U.S. PATENT DOCUMENTS

| | | | |
|---|---|---|---|
| 3,561,269 | 2/1971 | Seitz | 73/356 |
| 3,661,142 | 5/1972 | Flam | 73/356 |
| 3,661,142 | 5/1972 | Flam | 73/356 |
| 3,898,354 | 8/1975 | Parker | 73/356 |
| 3,965,742 | 6/1976 | Parker | 73/356 |
| 3,998,210 | 12/1976 | Nosari | 73/356 |
| 4,030,482 | 6/1977 | Navato | 73/356 |
| 4,138,889 | 2/1979 | Fraschini | 73/356 |
| 4,154,107 | 5/1979 | Giezen et al. | 73/356 |
| 4,198,861 | 4/1980 | Luk | 73/356 |
| 4,198,920 | 4/1980 | Russell | 73/356 |

FOREIGN PATENT DOCUMENTS 1344206  12/1974  United Kingdom ................. 73/356

*Primary Examiner*—Daniel M. Yasich
*Attorney, Agent, or Firm*—Laff, Whitesel, Conte & Saret

[57] ABSTRACT

A liquid crystal temperature indicator measures human body temperatures. The temperature indicator comprises a generally planar member for retention against an outer surface of a body. A number of deposits of liquid crystals, each activatable within a predetermined temperature range to be measured, are arranged behind temperature-indicating numerals. At a temperature within the predetermined temperature range, at least one of the deposits emits or reflects visible radiation to make corresponding numerals visible for indicating the surface temperature of the body. However, numerals are calibrated to the corresponding oral temperatures. A non-water soluble lacquer coating protects the deposits from moisture or humidity.

7 Claims, 3 Drawing Figures

LIQUID CRYSTAL TEMPERATURE INDICATOR FOR MEASURING HUMAN BODY TEMPERATURE

This is a continuation-in-part of U.S. application Ser. No. 940,746, filed Sept. 8, 1978 now U.S. Pat. No. 4,198,861.

This invention relates to a method of measuring human body temperature and, more particularly, to a liquid crystal temperature indicator suitable for measuring human body temperature.

Heretofore, human body temperature has normally been measured using mercury and alcohol thermometers, for example, by holding the thermometer under the tongue for a period of up to several minutes or rectally, especially for children. These conventional clinical thermometers can be cumbersome to use. Also, there are drawbacks, particularly when these thermometers are used to measure the temperature of, for example, infants, children, hospital patients, elderly persons, and people who are asleep or unconscious. Besides being inconvenient, conventional mercury thermometers utilize a glass tube, thereby creating the danger of possible breakage with injury from glass splinters and perhaps poisoning from the released mercury.

Moreover, the ordinary glass thermometer requires, on an average, 11 minutes to reach a reliable reading, as is shown by medical studies, for example, Oral Thermometry, *The Guthrie Bulletin*, W. C. Beck, M.D. and B. St. Cyr. R.N., Vol 43, April, 1974, pp. 170-185. Even then, such studies indicate that the accuracy of such readings on the standard commercial thermometer ranges from ±0.2 to ±2.6° F. (see pp. 175-176 of the Bulletin). The widespread use of only 3 minutes for taking a reading leads to greater inaccuracies.

An object of the present invention is to overcome or at least mitigate one or more of the above-mentioned limitations inherent in the conventional clinical thermometer.

Accordingly, a first aspect of the present invention provides a method of measuring human body temperature. A liquid crystal temperature indicator is designed to indicate the temperature of the body. This indicator generally comprises a planar member suitable for retention against an outer surface of a body. Within the member, deposits of liquid crystals are activatable within a predetermined temperature range to be measured and are arranged so that, at a temperature within the predetermined temperature range, at least one of the deposits emits or reflects a visible radiation. At the front of the member, the activation causes numerals to become visible and indicate the temperature of the body. The numerals are substantially non-visible if the corresponding deposit is not activated. The member has a coating for protecting the deposits from moisture or humidity, from the body, and from the atmosphere.

According to a second aspect of the present invention, a liquid crystal temperature indicator is suitable for measuring human body temperature. The temperature indicator comprises a generally planar member suitable for retention against a surface of a body. The member includes deposits of liquid crystals, which are activatable within a predetermined temperature range, to be measured. On temperature activation, the deposits emit or reflect visible radiation so that numerals indicating the temperature of the body become visible at the front of the member. These same numerals were not visible before the deposits were activated. A coating is provided for protecting the deposits from moisture or humidity from the body or from the atmosphere.

While the principles of the invention might, at first, appear simple, the practical aspects are far more complicated if accurate temperature readings are sought. Because the temperature of the outer surface of the body is being measured, care must be given to the relationship between a given body's temperature location and its susceptibility to variability. Controlling variability is of some importance to external body thermometry if accuracy is sought. Not only does external atmospheric temperature affect the surface temperature of the body, but the surface temperature is also highly variable, even over small distances. Therefore, in the selection of the size and shape of the body thermometer, care should be given so as to minimize these variable factors and also to optimize those zones that provide reliable readings.

It has now been found that small, concentrated areas (such as ovals, circles and rectangles) that stay within roughly 1.5 square inches achieve this optimizing for human thermometry. A preferred embodiment of the present invention includes this feature.

For a better understanding of the present invention and to show how the same may be put into effect, reference will now be made, by way of example, to the accompanying drawing, in which.

Figure 1:
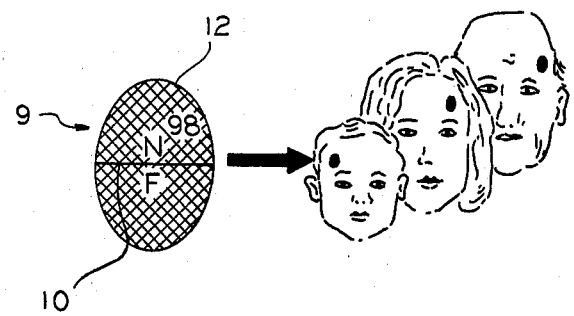
FIG. 1 shows an embodiment of a temperature indicator in accordance with the present invention and suitably applied to the forehead of a child, woman and elderly person.

The temperature sensitive substance is normally a cholesteric liquid crystal compound that produces a visible color change in response to a temperature activation. When activated, the temperature sensitive substance emits or reflects visible radiation to indicate temperature. Responsive to the temperature climbing to the activation temperature, the color sequence, in normal white light, is tan, red, green and blue and ultra-violet. The color red is normally the first visible response of the liquid crystals, when experiencing a temperature within its responsive range. The second response is the color green, as the temperature reaches the mid-zone of the temperature responsive range. The final color response is blue, when the reaction to the temperature goes beyond the temperature responsive range of a given liquid crystal. However, the blue color has a tendency to remain visible for some time after the temperature has exceeded the activation zone of the liquid crystal, thereby causing a visible reaction that may be misleading or confusing to those who attempt to read the temperature indicator.

A preferred embodiment of the present invention overcomes this difficulty by employing an optical filter, as more fully discussed hereinbelow. That filter visually blocks the blue color response of the liquid crystal. The optical filter may be a yellow-colored plastic film.

The liquid crystal is, preferably, selected so as to be responsive to a given temperature. As a result, it is possible to limit the visible reading to one numeral or symbol. However, two numerals or symbols may appear at the front of the member, when the temperature of the body is between the temperature indicated by the two numerals. Thus, if the numerals were 102 and 104 and a temperature indicating 103° F. (39.5° C.) were to be experienced by the body, both numerals 102 and 104 would be visible, thereby indicating a reading of 103. If an optical filter is not used to block the blue color, it might be likely that three numerals would be visible at one time which may cause some confusion in the interpretation of the readout.

Moisture and humidity can alter the response of the liquid crystals to temperature. Primarily, this is because contaminants in water may mix into the cholesteric liquid crystal and change its physical response. Therefore, to avoid a spurious response, the invention specifically includes a coating for protecting the deposits against attack by moisture or humidity from the human body or from the atmosphere. For example, this coating may be a non-water-based, preferably clear, lacquer. Such a coating can obviate, or at least mitigate, the detrimental effects of moisture or humidity, which might otherwise change or influence the color intensity of the liquid crystals. The coating can also prolong the life of the indicator.

Advantageously, the temperature indicator 9 comprises a non-transparent sheet of plastic material having transparent portions in the form of letters or numerals. Individually associated liquid crystal deposits are selectively situated behind these numerals. In such an embodiment, a separate optical or color filter is, preferably, situated between each deposit and the respective transparent portions of the plastic material sheet. Alternatively, the sheet of plastic material could be colored so that it is adapted to also act as a filter.

Conveniently, the sheet of transparent material is opaque on one side thereof, such as the back, except for the portions that remain transparent. For example, silk screen printing, using a black base ink, can be used to make the sheet opaque. The usual ink used for this purpose is too thick for successful passage through silk; therefore, it should be diluted with water but the water must be distilled to avoid an introduction of contaminants into the liquid crystal. The back of the sheet having the deposits thereon also has a coating to cover all the numerals, the coating preferably being applied by silk screen printing, again using a black base ink diluted with distilled water. A difficulty with this form of ink and printing is that there are many tiny bubbles which tend to form microscopic pores when the ink dries. These pores allow moisture and humidity to pass through the black base ink layer to the liquid crystal.

In a preferred embodiment, a transverse center line 10 divides the front of the sheet 12 into two zones, one having the associated reference letter "N" (normal) and the other having the reference letter "F" (fever). Situated in the "N" or normal zone of the sheet, the numerals which may be made visible comprise body numerals such as 94, 96 and 98 corresponding to a normal temperatures in the Fahrenheit (35, 36, 37 in the Celcius scale). Situated in the "F" or fever zone are numerals, such as 100, 102 and 104 corresponding to fever temperature, in the Fahrenheit scale (38, 29, 40 in the Celcius scale). The line and reference numerals may be applied to the sheet by silk screen printing. The back of the sheet has adhesive to enable the sheet to be attached readily to a surface of the body, such as to the forehead, the sheet being covered by a release paper or the like, before use. This adhesive should comply with safety and hygienic requirements and be acceptable for medical use. For convenience, a release paper covers the adhesive before use of the thermometer.

Since the adhesive is to be placed against human skin, it must not cause any allergic reaction. As a practical matter, this must mean that the adhesive is quite porous so that air may reach the skin under the adhesive which, in turn, means that moisture and humidity may also reach the liquid crystal. The 3 M Company sells such an adhesive.

A preferred embodiment of the present invention utilizes a correlation between skin temperature and the internal temperature, such as oral temperatures, of the body. For example, in this embodiment, the indicator can indicate not only the actual skin temperature but also the internal, such as oral, temperature corresponding to that actual skin temperature. One advantage of this embodiment is that most people are familiar with oral temperature readings.

Studies of correlation between internal, such as oral, and skin temperature show that for an accurate reading on the forehead, the liquid crystals operate about 4.3° F. below the normal oral temperature to indicate a normal temperature. In other words, at normal temperature, external cooling lowers the external body temperature by approximately 4.3° F. However, in a preferred embodiment, a differential of 2.3° F. below the fever temperature is used for the response temperature of the liquid crystals on the forehead, since it would not be prudent or advisable to rely on the differential 4.3° when a person has a fever. Thus, for a 100° F. (38° C.) temperature reading, a liquid crystal responsive to 98° F. (37° C.) is used and for a 96° F. (36° C.) temperature reading, a liquid crystal responsive to 94° F. )35° C.) is used. For normal temperatures, a liquid crystal having a 90° F. (32° C.) center is often used, having a 5° spread for the normal temperature. For lower temperatures, a liquid crystal having a narrow band selection is used.

In FIG. 1, a temperature indicator 9 is in the form of an oval disc, black in appearance, and having a back adapted to be affixed to the forehead of a person. As shown, the disc is of a small size, in relation to the forehead of a person. Color markings are visible at the front of the disc, namely a transverse center line. The letters "N" and "F" are positioned centrally above and below the line 10, for indicating a normal zone and fever zone, respectively.

Figure 3:
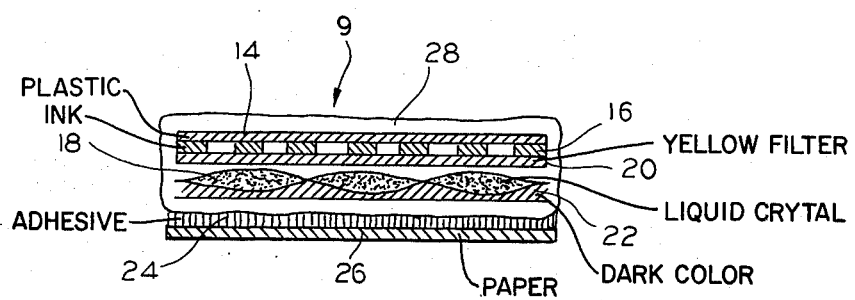
FIG. 3 is a cross section of the structure of the invention, taken along line 10 of FIG. 1.

The oval disc comprises a thin, oval, transparent sheet of plastic material 14 (FIG. 3), such as a plastic filter film of transparent material. Reference numerals are imprinted on one side, preferably the back, for example, by a black base ink 16, preferably with a silk screen printing. The reference numerals are situated so that the numerals 94, 96, 98 appear sequentially in a clockwise manner, in the upper or normal temperature zone of the oval sheet and above the transverse line 10. The reference numerals 104, 102 and 100 appear sequentially in a clockwise manner in the lower or fever temperature zone of the sheet and below the transverse line.

A deposit of cholesteric compound 18, commonly called liquid crystals, is situated behind each reference numeral. Each deposit responds by changing its color at a different temperature, within the range of 94° F. and 104° F. (35 and 40° C.), with the indicated temperatures corresponding to internal body temperatures, as distinguished from the surface temperature. Variations in color of the deposits are achieved according to the temperature response of the liquid crystals as previously described. These colors are enhanced by this invention since moisture and humidity are not allowed to enter and mix with the liquid crystal material.

An optical filter 20, such as an oval yellow color plastic filter film, is situated between each deposit and the sheet. The filter blocks the colors blue and ultraviolet, thereby avoiding the continuous display of a blue reading, as earlier discussed. Alternatively, the plastic of sheet 14 may itself be a yellow filter. The optical filter may also make the colors tan and red more easily distinguished and the color green more vivid. A dark coating 22 is applied at the back of the sheet to cover all the numerals, thereby enhancing the readability of the indicator.

An adhesive 24 can be applied to the back of the disc 9 to enable it to be attached to the forehead of a person.

The dark coating may be simply a black base ink 22 applied to the sheet after an application of the deposits and filters thereto, for example, by using silk screen printing.

The construction preferably begins with a silk screen printing, at 16, of the letters N and F, numerals, and any other markings on the sheet of plastic 14 followed by the application of the cholesteric deposits 18 and optical filter 20 to the sheet. Then, further silk screen printing is applied to cover the entire back of the assembly and finally the adhesive 24 and release paper 26 are applied. As is apparent, the oval 9 can be die-stamped from a sheet treated either before or after, as described above.

At normal room temperature, the liquid crystals do not respond to produce a color change and, therefore, no reference letters or numerals are normally visible at the front of the disc. On use of the indicator, the release paper 26 is removed from the back of the disc and the temperature indicator is applied by pressing the adhesive 24 against the forehead, for example, and preferably in the area where the right and left superior orbital artery traverses the eyebrow. As a factor in the reliability of the temperature reading, the location and size of the indicator is of some importance. The location above the right and left superior orbital artery, as an illustration, provides a relatively reliable measure.

Figure 2:
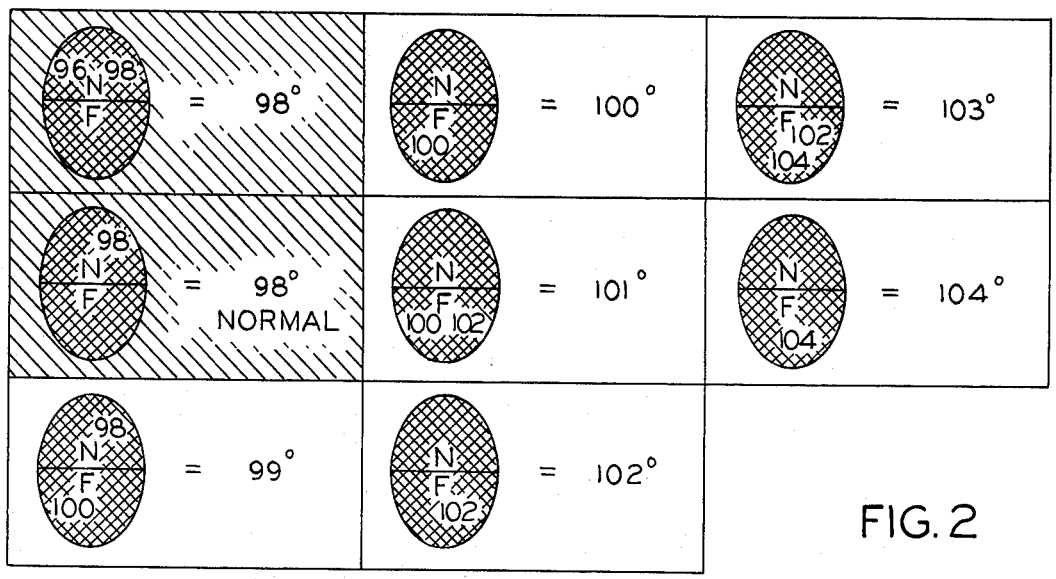
FIG. 2 shows a table of a series of the indicators of FIG. 1, each indicating a different temperature reading.

After a few seconds, the temperature indicator begins to display the temperature corresponding, for example, to the internal body temperature. Normally, only one of the numerals is activated. If, however, the temperature corresponds to a temperature between two of the numerals, two numerals are activated, the lower numeral normally being a color in the lower, green, region of the color sequence and the higher numeral being a color in the higher, reddish, region of the color sequence (see FIG. 2).

The temperature indicator can be readily attached to the forehead of a person or a child and can give relatively accurate and continuous reading in a matter of seconds. Because the temperature readings 94 to 98 are in the "N", that is, the normal zone, and the temperature readings 100 to 104 in the "F," that is, the fever zone, both the degree of the temperature and whether it is normal or fever can be readily seen. If required, different reference numerals can be chosen or a different scale (Centigrade, for example) can be used.

When measuring body temperature, care should be taken when using this temperature indicator. Preferably, the person should be resting and the forehead should be dry, because a damp or wet forehead may result in a reading which is lower than the actual body temperature. During a reading, drafts and strong light or heat should be avoided. Such drafts, light and heat might be caused by direct sunlight or close stoves, heaters, and air conditioners, for example. The ambient temperature should be between 60° F. and 85° F. (15° to 29° C.), when using the temperature indicator. However, if the ambient temperature is below 60° F. (15° C.), 1° F. should be added to the reading and, if the ambient temperature is above 85° F. (29° C.), 1° F. should be subtracted from the reading. The indicator may be reused and, if the adhesive backing should lose its effectiveness in time, the disc can readily be attached to the forehead by applying a cellophane tape or adhesive tape to the front of the disc and to the forehead.

For ease of use and for protection, the temperature indicator is preferably kept in a case having either an oval insert or an oval-shaped flange to retain the thermometer in position.

Therefore, this embodiment of the indicator is easy to use, quick, safe, reliable, convenient and unbreakable. This embodiment of the indicator is substantially easier to read than the conventional body thermometer. In addition, the indicator is unbreakable in the traditional sense that glass thermometers are breakable. Moreover, by providing a continuous reading, the indicator enables the user to monitor hospital patients, invalids and children without repeatedly disturbing them. And more importantly, the indicator provides a reliable temperature reading in seconds, whereas the conventional thermometer requires many minutes.

A preferred embodiment of the temperature indicator includes an oval disc comprising an inert plastics substrate coated with cholestric liquid mixture and laminated with inert black backing and hypo-allergical medical grade adhesive. The oval disc is preferable 2.54 cm in length, 1.94 cm in width and 0.051 cm thick and measures body temperature in 1° C. increments. When affixed to the body surface, the indicator is affixed, in use, to the supraorbital region of the forehead and indicates a digital reading of the temperature. If the temperature lies between digits, two numerals appear at the same time. Alternatively, the disc can be oval, for example, 1 inch in length and ¾ inch wide, that is, having a surface area of 1.75 square inches.

Digits can be selected, as desired. Preferred selection is 94° F., 96° F., 98° F., 100° F., 102° F., 104° F., or 35° C., 36° C., 37° C., 38° C., 39° C., 40° C. although, if required, the 94° F. or 35° C. reading can be omitted.

In all the embodiments hereinbefore described, the indicator includes a coating 28 of a non-water-based clear lacquer to block any air holes or microscopic pores, especially in the backing ink, for protecting the deposits from moisture and humidity in the atmosphere. If required, the coating can also be applied so as to protect the deposits from moisture, such as perspiration, from the human body. Preferably, this lacquer coating is located between the black ink backing and the adhesive. This enables the adhesive coating to "breath" insofar as the skin is concerned without simultaneously enabling moisture and humidity to attack the liquid crystal material.

Those who are skilled in the art will readily perceive how to modify the system. Therefore, the appended claims are construed to cover all equivalent structures which fall within the scope and spirit of the invention.

I claim:

1. A liquid crystal temperature indicator for measuring human body temperature, which temperature indicator comprises a generally planar member suitable for retention against a surface of a body, a plurality of numerals formed at different locations on said planar member; the member comprising a transparent plastic film over a plurality of deposits of liquid crystals deposited behind individually associated ones of said numerals, each of said deposits being activatable within an individually associated predetermined temperature range corresponding to a body temperature which is to be measured and being arranged so that, on temperature activation, the deposits emit or reflect visible radiation to make the associated numerals visible at the front of the member, the visible numerals indicating the temperature of the body, an optical filter between said numerals and said liquid crystal deposits for reducing or blocking a blue color response of the liquid crystals upon activation, and unbroken waterproof coating means completely surrounding and encapsulating on all sides of the entire indicator for protecting the deposits from moisture or humidity between said numerals and said liquid crystal deposits.

2. The indicator of claim 1 and adhesive means on the outside of said waterproof coating for enabling said indicator to be adhered to said body surface, said adhesive being porous to enable skin under said indicator to breathe.

3. An indicator according to claim 1, wherein said coating means comprises a non-water soluble lacquer.

4. An indicator according to claim 1, wherein the numerals indicate the corresponding oral temperature of the body.

5. An indicator according to claim 1, wherein the area of the planar member is about 1.5 square inches or less.

6. An indicator according to claim 1 wherein said sheet is divided into two zones, one of said zones being associated with liquid crystal deposits which become activated by temperatures in the normal body temperature range and the other of said zones being associated with liquid crystal deposits which become activated by temperatures in the body fever temperature range, and wherein the numerals rendered visible, in use, include the numerals are 35, 36 and 37 in the Celcius scale, situated in the normal zone and the numerals 38, 39 and 40 in the Celcius scale, situated in the fever zone (or their Fahrenheit equivalents).

7. The indicator of claim 1 wherein any water which may be required to be used during the manufacture of the indicator is distilled water.

* * * * *

UNITED STATES PATENT AND TRADEMARK OFFICE
CERTIFICATE OF CORRECTION

PATENT NO. : 4,302,971

DATED : December 1, 1981

INVENTOR(S) : Catherine M. Luk

It is certified that error appears in the above—identified patent and that said Letters Patent is hereby corrected as shown below:

Col. 3, line 62, "29" should be --39--;

Claim 1, lines 18 and 19, delete "between said numerals and said liquid crystal deposits";

Claim 6, line 17, delete "are".

Signed and Sealed this

Twentieth Day of April 1982

|SEAL|

*Attest:*

*Attesting Officer*

GERALD J. MOSSINGHOFF

*Commissioner of Patents and Trademarks*